United States Patent
Lamarre et al.

(10) Patent No.: US 11,280,683 B2
(45) Date of Patent: Mar. 22, 2022

(54) METHOD AND SYSTEM FOR DETECTING HIGH TURBINE TEMPERATURE OPERATIONS

(71) Applicant: PRATT & WHITNEY CANADA CORP., Longueuil (CA)

(72) Inventors: Sylvain Lamarre, Boucherville (CA); Alexandre Charest, Montreal (CA); Nicolas Des Roches-Dionne, Montreal (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 217 days.

(21) Appl. No.: 15/609,633

(22) Filed: May 31, 2017

(65) Prior Publication Data
US 2018/0348065 A1 Dec. 6, 2018

(51) Int. Cl.
| | | |
|---|---|---|
| F01D 17/08 | (2006.01) |
| G01K 7/02 | (2021.01) |
| F02C 9/00 | (2006.01) |
| G01K 3/10 | (2006.01) |
| G01K 7/16 | (2006.01) |
| G01K 7/34 | (2006.01) |
| G01K 13/08 | (2006.01) |
| H01C 7/12 | (2006.01) |

(Continued)

(52) U.S. Cl.
CPC .............. *G01K 7/02* (2013.01); *F01D 17/085* (2013.01); *F02C 9/00* (2013.01); *G01K 3/10* (2013.01); *G01K 7/16* (2013.01); *G01K 7/346* (2013.01); *G01K 13/08* (2013.01); *H01C 7/123* (2013.01); *F02D 41/1447* (2013.01); *F05D 2260/80* (2013.01); *F05D 2270/112* (2013.01); *F05D 2270/3013* (2013.01); *G01K 13/024* (2021.01); *G01K 2205/04* (2013.01)

(58) Field of Classification Search
CPC ......... F01D 17/085; G01K 2205/1447; G01K 7/02; G01K 2013/024; G01K 2013/04; G01K 7/16; G01K 7/346; G01K 13/08; F02D 41/1447; F02C 9/00; H01C 7/123; F05D 2260/80; F05D 2270/112; F05D 2270/3013
USPC ......................................................... 123/576
See application file for complete search history.

(56) References Cited

U.S. PATENT DOCUMENTS

| | | | | |
|---|---|---|---|---|
| 2,589,971 A | * | 3/1952 | Skarstrom | F02C 7/262 73/112.01 |
| 2,924,388 A | * | 2/1960 | Beck | F01D 17/085 236/99 R |

(Continued)

OTHER PUBLICATIONS

Extended European Search Report dated Oct. 18, 2018 in connection with corresponding European patent application No. 18175385.6.

*Primary Examiner* — Logan M Kraft
*Assistant Examiner* — Joshua Campbell
(74) *Attorney, Agent, or Firm* — Norton Rose Fulbright Canada LLP

(57) ABSTRACT

Herein provided are methods and systems for detecting a high temperature condition of a gas turbine engine. A fuel flow to a combustor of the engine and a compressor outlet pressure of the engine are obtained. A ratio of the fuel flow to the compressor outlet pressure is determined. The ratio is compared to a threshold and a high temperature condition of the engine is detected when the ratio exceeds the threshold.

18 Claims, 7 Drawing Sheets

(51) Int. Cl.
   *G01K 13/024* (2021.01)
   *F02D 41/14* (2006.01)

(56) References Cited

U.S. PATENT DOCUMENTS

| | | | | |
|---|---|---|---|---|
| 3,002,349 | A * | 10/1961 | Starr | F02C 9/16 60/39.281 |
| 3,129,643 | A * | 4/1964 | Stearns | F02C 9/32 91/382 |
| 3,307,353 | A * | 3/1967 | Stearns | F02C 9/16 60/39.281 |
| 3,517,509 | A * | 6/1970 | Bayati | F02K 3/077 60/226.1 |
| 3,636,335 | A * | 1/1972 | Nelson | G06G 7/64 702/130 |
| 3,678,690 | A * | 7/1972 | Shohet | F02K 3/06 60/226.3 |
| 3,678,691 | A * | 7/1972 | Shohet | F02K 3/075 60/239 |
| 4,083,235 | A * | 4/1978 | Gallant | G01M 15/00 340/966 |
| 4,263,781 | A * | 4/1981 | Harner | F02C 9/28 560/115 |
| 4,326,376 | A | 4/1982 | Stearns et al. | |
| 4,449,358 | A * | 5/1984 | Mani | F04D 27/02 60/39.25 |
| 4,470,118 | A | 9/1984 | Morrison | |
| 4,947,643 | A * | 8/1990 | Pollak | F02C 9/28 60/236 |
| RE38,831 | E * | 10/2005 | Horii | F02C 7/1435 60/39.3 |
| 7,159,568 | B1 * | 1/2007 | Lewis | F02D 19/0692 123/431 |
| 7,395,786 | B2 * | 7/2008 | Leone | F02D 41/064 123/1 A |
| 8,677,761 | B2 | 3/2014 | Leach | |
| 8,762,025 | B2 | 6/2014 | Aurousseau | |
| 2011/0023478 | A1 * | 2/2011 | Oakley | F02D 41/1446 60/599 |
| 2011/0041510 | A1 | 2/2011 | Sasaki et al. | |
| 2011/0301822 | A1 * | 12/2011 | Aurousseau | F02C 9/52 701/100 |
| 2017/0022907 | A1 | 1/2017 | Argote et al. | |

\* cited by examiner

200

```
┌─────────────────────────────────────────┐
│ Obtaining a fuel flow to a combustor of │ 202
│ the engine and a compressor outlet      │
│ pressure of the engine                  │
└─────────────────────────────────────────┘
                    ↓
┌─────────────────────────────────────────┐
│ Determining a ratio of the fuel flow to │ 204
│ the compressor outlet pressure          │
└─────────────────────────────────────────┘
                    ↓
┌─────────────────────────────────────────┐
│ Determining a current engine rotational │ 205
│ speed                                   │
└─────────────────────────────────────────┘
                    ↓
┌─────────────────────────────────────────┐
│ Selecting a threshold from a plurality  │ 207
│ of thresholds as a function of a        │
│ current operating state of the engine   │
└─────────────────────────────────────────┘
                    ↓
┌─────────────────────────────────────────┐
│ Comparing the ratio to a threshold      │ 206
└─────────────────────────────────────────┘
                    ↓
┌─────────────────────────────────────────┐
│ Detecting a high temperature condition  │ 208
│ of the engine when the ratio exceeds    │
│ the threshold                           │
└─────────────────────────────────────────┘
```

FIGURE 2

METHOD AND SYSTEM FOR DETECTING HIGH TURBINE TEMPERATURE OPERATIONS

TECHNICAL FIELD

The present disclosure relates generally to gas turbine engines, and more particularly to detecting high turbine temperature operations.

BACKGROUND OF THE ART

In aircraft, gas turbine engine temperatures are typically monitored by an electronic control system and/or a pilot. The engine temperatures may be measured between compressor turbines and power turbines by use of temperature sensors (e.g., thermocouples). The temperature may be determined by an engine temperature measurement system which computes an average of measurement values from the temperature sensors.

However, the engine temperature measurement system may fail and/or the average of the measurement values by the temperature sensors may be incorrect, for example when one or more of the sensors has malfunctioned. In such an event, the electronic control system or the pilot would lose the ability to monitor the turbines temperature.

As such, there is room for improvement.

SUMMARY

In one aspect, there is provided a method for detecting a high temperature condition of a gas turbine engine. The method comprises obtaining a fuel flow to a combustor of the engine and a compressor outlet pressure of the engine; determining a ratio of the fuel flow to the compressor outlet pressure; comparing the ratio to a threshold; and detecting a high temperature condition of the engine when the ratio exceeds the threshold.

In another aspect, there is provided a system for detecting a high temperature condition of a gas turbine engine. The system comprises a processing unit and a non-transitory computer-readable memory having stored thereon program instructions executable by the processing unit. The program instructions are executable by the processing unit for obtaining a fuel flow to a combustor of the engine and a compressor outlet pressure of the engine; determining a ratio of the fuel flow to the compressor outlet pressure; comparing the ratio to a threshold; and detecting a high temperature condition of the engine when the ratio exceeds the threshold.

BRIEF DESCRIPTION OF THE DRAWINGS

Reference is now made to the accompanying figures in which:

FIG. 2 is a flowchart illustrating an example method for detecting a high temperature condition of an engine in accordance with an embodiment;

It will be noted that throughout the appended drawings, like features are identified by like reference numerals.

DETAILED DESCRIPTION

Figure 1:
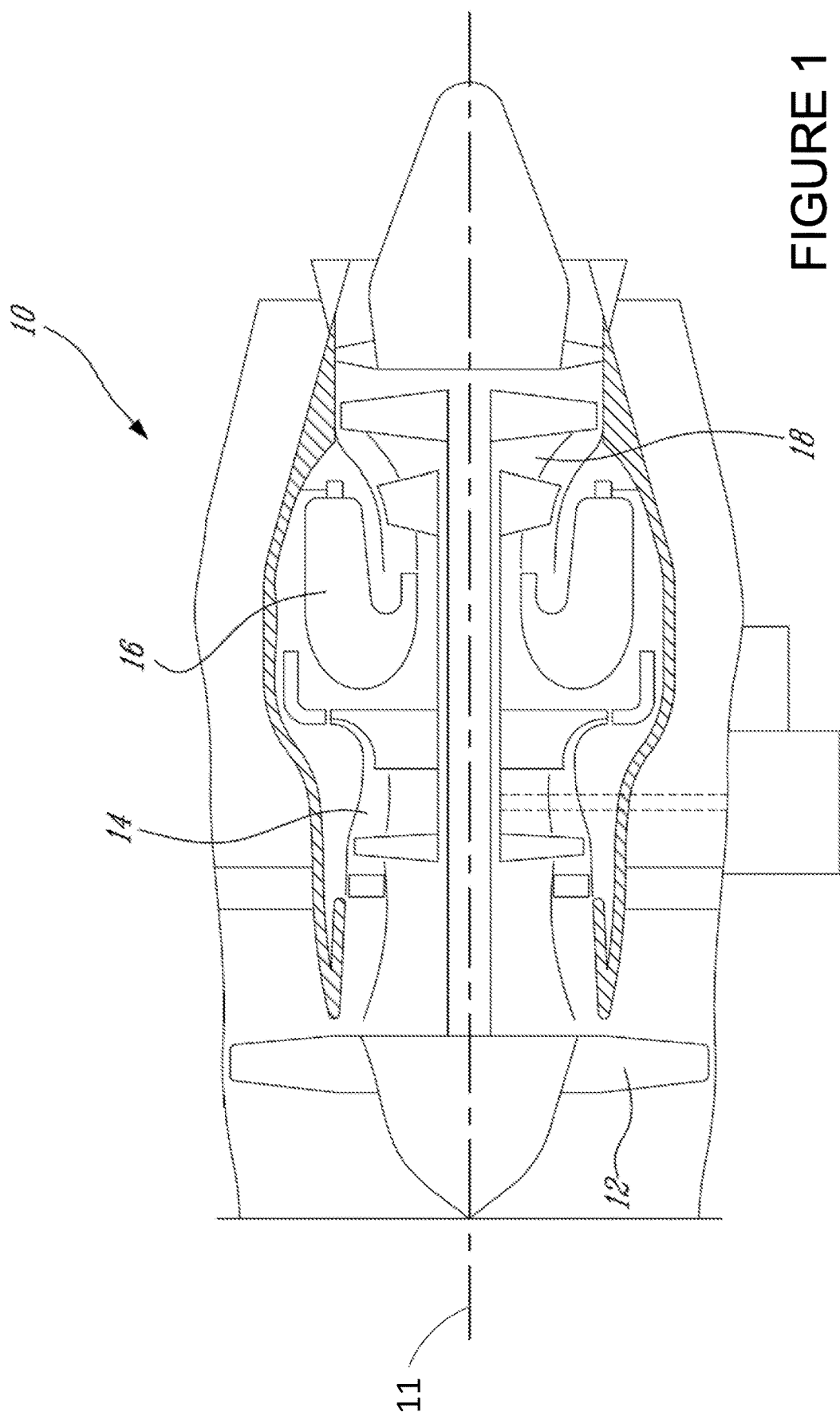
FIG. 1 is a schematic of an example gas turbine engine.

FIG. 1 illustrates a gas turbine engine 10 for which a high temperature condition may be detected using the methods and systems described herein. Note that while engine 10 is a turbofan engine, the high temperature detecting methods and systems may be applicable to turboprop, turboshaft, and other types of gas turbine engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

With reference to FIG. 2, there is illustrated a flowchart of an example method 200 for detecting a high temperature condition of an engine, such as engine 10 of FIG. 1. The high temperature condition of the engine 10 refers to the engine 10 operating at a temperature that may lead to overheating and/or damage to the engine 10. Method 200 may be performed at regular or irregular time intervals during operation of the engine. In some embodiments, method 200 is performed upon a specific request, for example from a pilot input, from an engine control system, from an aircraft control system, or from any other control system in communication with the engine 10.

At step 202, a fuel flow to the combustor 16 of the engine 10 and a compressor outlet pressure of the engine 10 are obtained. In accordance with an embodiment, fuel flow to the combustor 16 can be measured using a fuel flow measuring device, such as a flow meter, a microfluidic sensor, and the like. In accordance with another embodiment, the fuel flow to the combustor 16 can be estimated. The estimated fuel flow may be based on fuel flow commanded by a control system and/or a fuel flow demand. Any other suitable technique for fuel flow estimation with accuracy within a suitable range (e.g., 6 to 10% accuracy range) may be used. Discharge pressure of the compressor 14 can be measured using a pressure measuring device, such as a pressure gauge, a pressure transducer, a pressure sensor, and the like. The fuel flow and the pressure may be dynamically obtained in real time when needed, or may be recorded regularly in accordance with any predetermined time interval. In some embodiments, the fuel flow and pressure are obtained via existing components as part of engine control and/or operation and are simply provided for the purposes of method 200. Alternatively, step 202 comprises triggering a measurement or estimation of fuel flow and/or pressure whenever method 200 is initiated.

At step 204, a ratio of the fuel flow to the compressor outlet pressure is determined. The ratio may be defined as follows:

$$RU = \frac{Wf}{P3} \quad (1)$$

In equation 1, RU is the ratio, Wf is the fuel flow to the combustor 16 of the engine 10 and P3 is the discharge pressure of the compressor 14 of the engine 10. It is noted that the thermodynamic characteristic of the engine 10 may be modeled with the ratio of equation 1.

The ratio may be plotted as a function of the engine rotational speed (Ng) to provide an operating line, when the engine 10 is operating under a steady state condition. An example is provided in FIG. 3A, where multiple operating lines 302-312 are illustrated. The operating line is a curve which illustrates the ratio over a range of engine rotational speeds for a specific steady state operating condition. In general, steady state operation of the engine 10 refers to: all parameters of the engine 10 being stable, such as, fuel flow, engine temperature, engine rotational speed, torque, etc.; there being no pilot input to change the conditions of the engine 10; constant extractions, such as, bleed, load, etc.; and constant ambient conditions, such as, altitude, air temperature, etc.

Figure 3A:
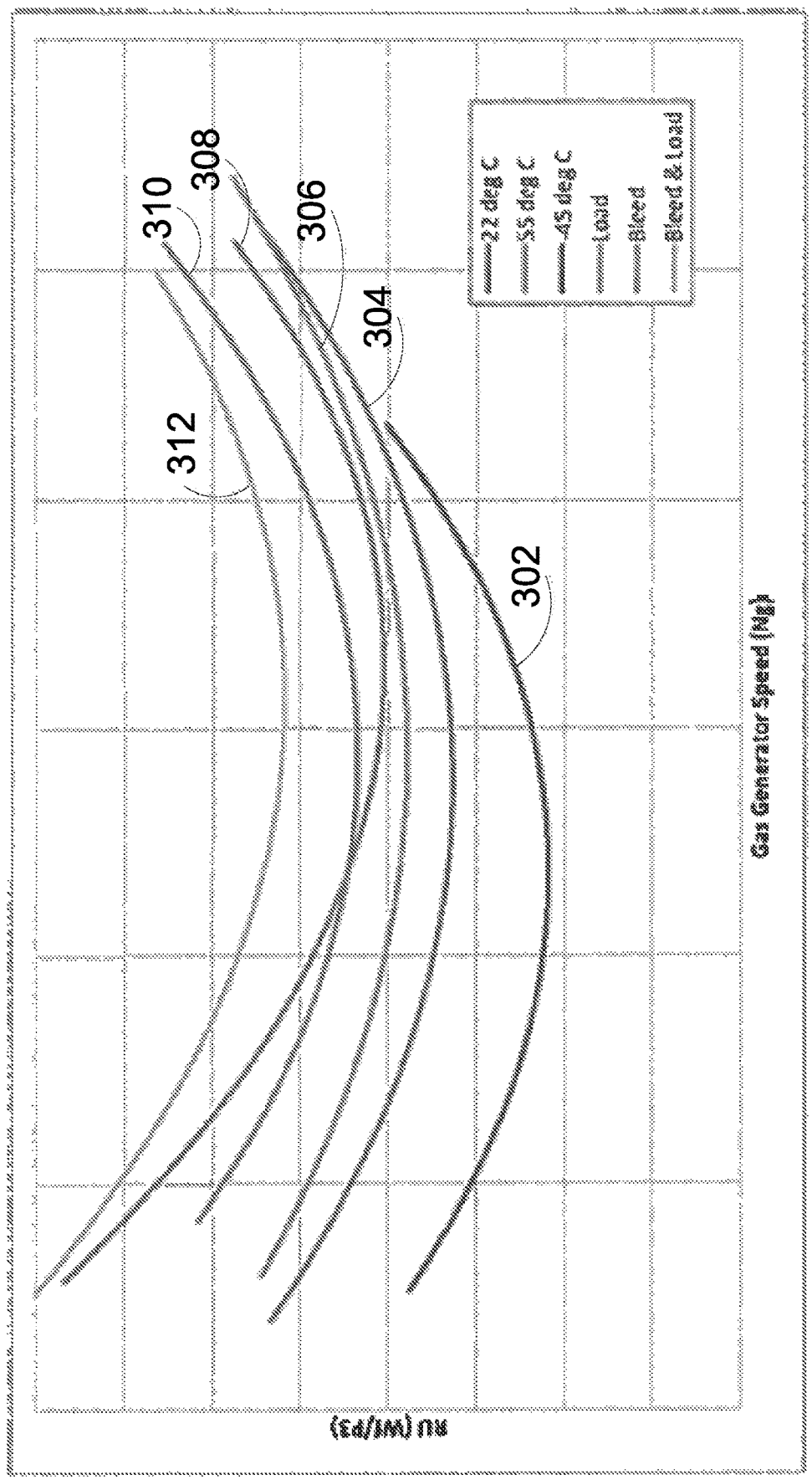
FIG. 3A is an example graphical representation of curves of a ratio between a fuel flow to a combustor of an engine and a discharge pressure of a compressor of the engine as a function of engine rotational speed for various operating conditions.
Figure 3B:
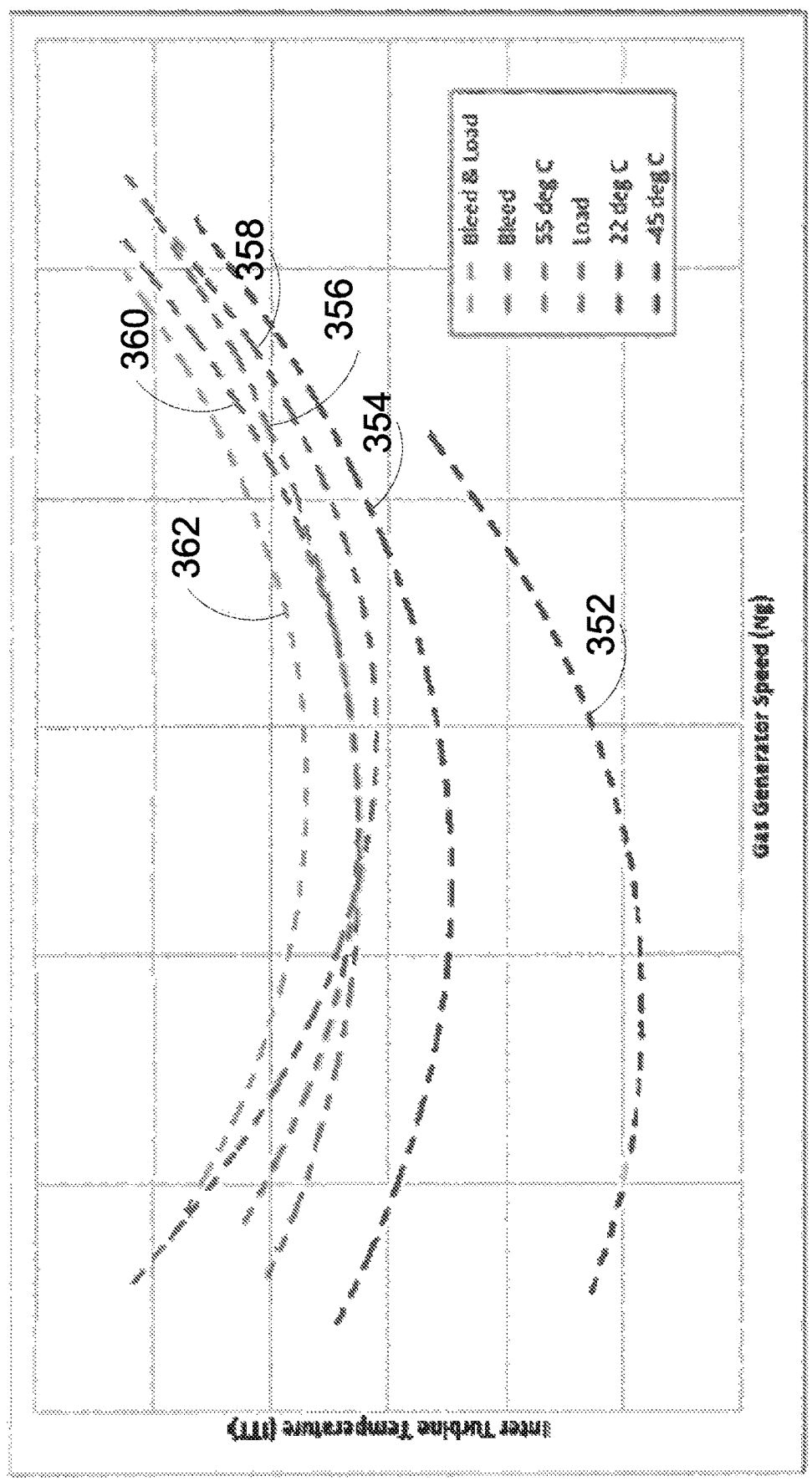
FIG. 3B is an example graphical representation of engine temperatures for various operating conditions as a function of engine rotational speed.

FIG. 3B illustrates example curves 352-362 of measured engine temperature as a function of engine rotational speed for the same steady state operating conditions of FIG. 3A. As illustrated in FIG. 3B, the operating line for a specific steady state operating condition generally corresponds with a measured engine temperature over a range of engine rotational speeds for the same steady state operating condition. Accordingly, the ratio may be used to generally model the temperature of the engine 10. It can be noted that in FIG. 3B, the engine temperature is measured at the turbine section 18 and referred to as inter turbine temperature (ITT). Referring to FIGS. 3A and 3B, a first operating line 302 and corresponding first curve 352 are illustrated for an ambient temperature of −45 degrees Celsius; a second operating line 304 and corresponding second curve 354 are illustrated for an ambient temperature of 22 degrees Celsius; a third operating line 306 and corresponding third curve 356 are illustrated for an ambient temperature of 55 degrees Celsius; a fourth operating line 308 and corresponding fourth curve 356 are illustrated for a maximum electrical load applied to the engine 10; a fifth operating line 310 and corresponding fifth curve 360 are illustrated for a maximum bleed applied on the engine 10; and a sixth operating line 312 and corresponding sixth curve 362 are illustrated for both a maximum electrical load and bleed applied to the engine 10.

Referring back to FIG. 2, at step 206, the ratio of the fuel flow to the compressor outlet pressure is compared to a threshold. The comparison of the ratio to the threshold may comprise determining if the ratio exceeds the threshold and/or if the ratio is lower than the threshold.

In accordance with an embodiment, the threshold (T) defines a first range (0 to T1) of ratio values below the threshold and a second range (T1 to T2) of ratio values above the threshold, where the first range corresponds to the engine 10 being within an acceptable operating temperature and the second range corresponds to the engine 10 being in the high temperature condition. The ratio values correspond to values of the ratio of equation 1

Figure 4A:
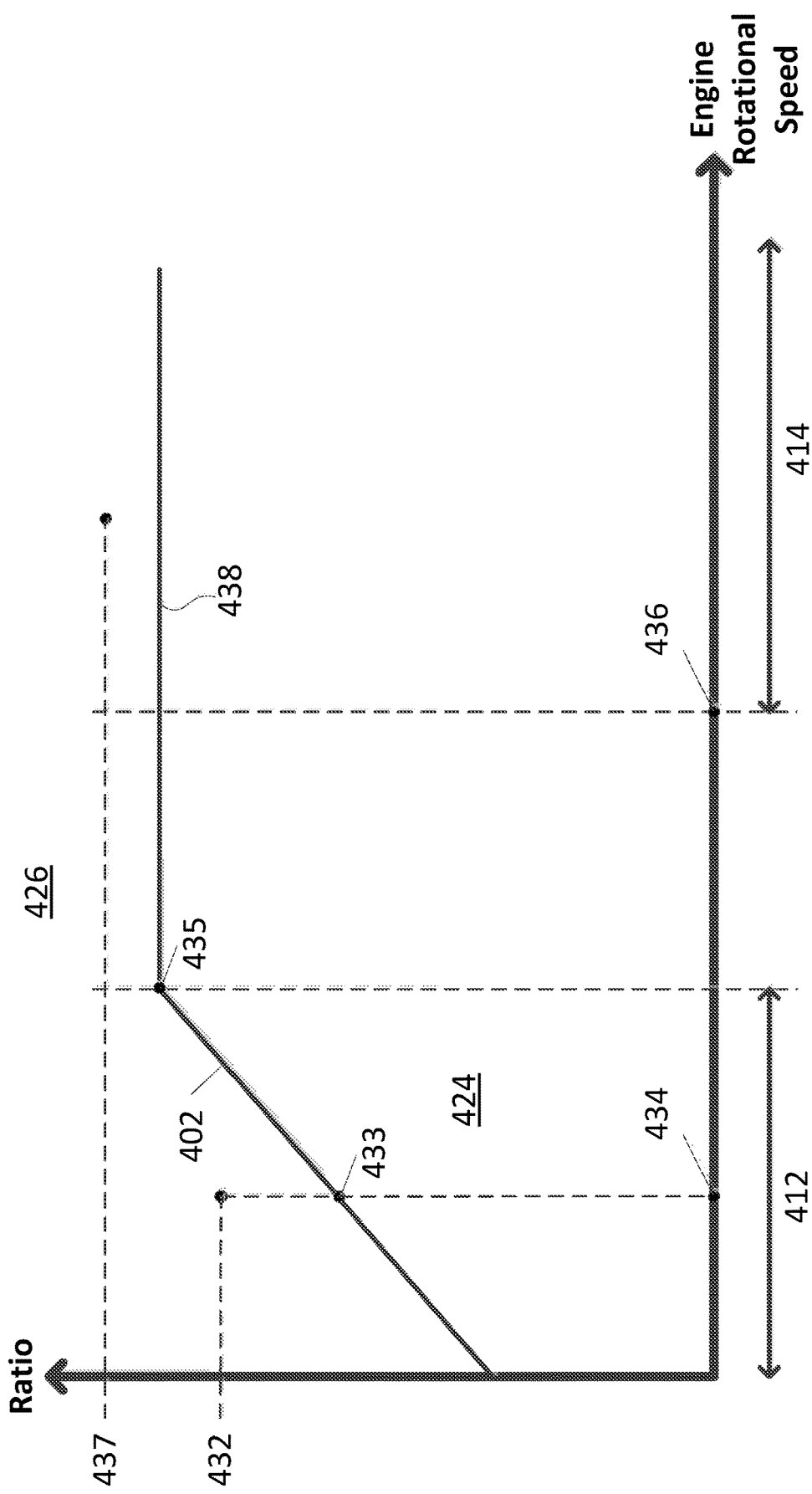
FIG. 4A is an example graphical representation of a threshold for detecting a high temperature condition of an engine.

In accordance with an embodiment, the threshold varies as a function of engine rotational speed. With additional reference to FIG. 4A, an example graphical representation of a threshold 402 is illustrated, where the threshold 402 varies as a function of engine rotational speed. In FIG. 4A, the x-axis corresponds to engine rotational speed and the y-axis correspond to ratio values of the ratio of fuel flow to the combustor 16 of the engine 10 and a discharge pressure of the compressor 14 of the engine 10. In the illustrated embodiment, the threshold 402 defines a first region 424 of ratio values as function of engine rotational speed below the threshold 402 and a second region 426 of ratio values as a function of engine rotational speed above the threshold 402, where the first region 424 corresponds to the engine 10 being within an acceptable operating temperature and the second region 426 corresponds to the engine 10 being in the high temperature condition.

In the embodiment illustrated, the threshold 402 increases with increasing engine rotational speed for a first range 412 of engine rotational speeds and is constant for a second range 414 of engine rotational speeds. The second range 414 is shown following the first range 412. In other words, in this embodiment, the threshold 402 increases with increasing engine rotational speed until a point 435 where it levels off and remains substantially constant. While the first range 412 and the second range 414 are shown to be disjoint from each other, in other embodiments, the first range 412 and the second range 414 are continuous with each other.

Referring back to FIGS. 3A and 3B, it can be observed that the temperature of the engine 10 may increase when the engine 10 is operating with low engine rotational speeds and/or when the engine 10 is operating with high engine rotational speeds. When the engine 10 is operating with low engine rotational speeds, this refers to a low power operation of the engine 10 and may correspond to the engine 10 idling. When the engine 10 is operating with high engine rotational speeds, this may correspond with the engine 10 accelerating. When the engine 10 is in low power operation, the temperature of the engine 10 can be observed to increase, especially when the extractions (e.g., cabin bleed and/or electrical load) on the engine 10 are applied. The temperature of the engine 10 can also be observed to increase when the engine 10 is accelerating and increases with increasing ambient temperature. As shown in FIGS. 3A and 3B, at low engine rotational speeds and at high engine rotational speeds, the operating lines 302 304 306 308 310 312 and curves 352 354 356 358 360 362 are shown to curve upwards indicating increasing temperature of the engine 10. Also, as the ambient temperature increases and/or extractions are applied, the curves 352 354 356 358 360 362 illustrate an increasing temperature of the engine 10. As such, the threshold which varies with engine rotational speed may be designed based on the aforementioned observations. Accordingly, the threshold may be determined by testing and/or by simulation of the engine 10 under various steady state operating conditions.

Referring back to FIG. 2, the method 200 may further comprise at step 205 determining a current engine rotational speed and step 206 may comprise comparing the ratio to the threshold 402 based on the current engine rotational speed. As shown in FIG. 4A, a first example ratio 432 is plotted based on a first current engine rotational speed 434. Comparison of the first example ratio 432 to the threshold 402 may comprise determining a threshold value 433 from the threshold 402 corresponding with the determined first current engine rotational speed 434 and comparing the first example ratio 432 to the threshold value 433. While in this embodiment, the threshold value 433 is obtained from the threshold 402 which is illustrated as a curve, in other embodiments, the threshold value may be determined from an equation, a look-up table and/or any other suitable technique.

In accordance with an embodiment, the first range 412 of engine rotational speeds corresponds to the engine 10 in low power operation and the second range 414 of engine rotational speeds corresponds to the engine 10 accelerating. Determining the current engine rotational speed may comprise determining whether the engine 10 is in low power operation and/or whether the engine 10 is accelerating. Accordingly, a state of the engine 10 may be determined, where the state corresponds to the engine 10 in low power operation or accelerating. Depending on the state of the engine 10 the comparison of the ratio to the threshold 402 may vary. For example, if the engine 10 is in low power operation a threshold that varies as a function of engine rotational speed may be used. By way of another example, if the engine 10 is accelerating a constant threshold may be used.

As shown in FIG. 4A, a second example ratio 437 is illustrated. Comparison of the second example ratio 437 to the threshold 402 may comprise determining a constant threshold value 438 from the threshold 402 based on a current engine rotational speed and/or the state of the engine 10 (e.g., accelerating) and comparing the second example ratio 437 to the constant threshold value 438.

In other embodiments, the threshold may vary as a function of engine rotational speed differently than as illustrated in FIG. 4A. Accordingly, the threshold 402 is provided for example purposes only.

At step 208, the high temperature condition of the engine 10 is detected when the ratio of the fuel flow to the compressor outlet pressure exceeds the threshold. For example, the first example ratio 432 is illustrated as exceeding the threshold 402 in FIG. 4A.

Detecting of the high temperature condition may comprise sending an alert indicative of the high temperature condition. The alert may be sent to an aircraft command system which may then indicate to a pilot and/or other crew members that the engine 10 is in the high temperature condition such that the pilot and/or crew members may then take one or more corrective action. The alert may be sent to the control system to take one or more corrective action. Corrective actions may comprise: reducing the extractions (e.g., reducing electrical load and/or cabin bleed) on the engine 10; preventing any extractions (e.g., preventing electrical load and/or cabin bleed) on the engine 10; shutting down the engine (e.g., when the engine 10 is idling on the ground); increasing fuel flow to the combustor in case of low power operation (e.g., idling); reduce over fueling caused by an acceleration schedule; modulate the acceleration of the engine 10; and/or any other suitable corrective action.

Figure 4B:
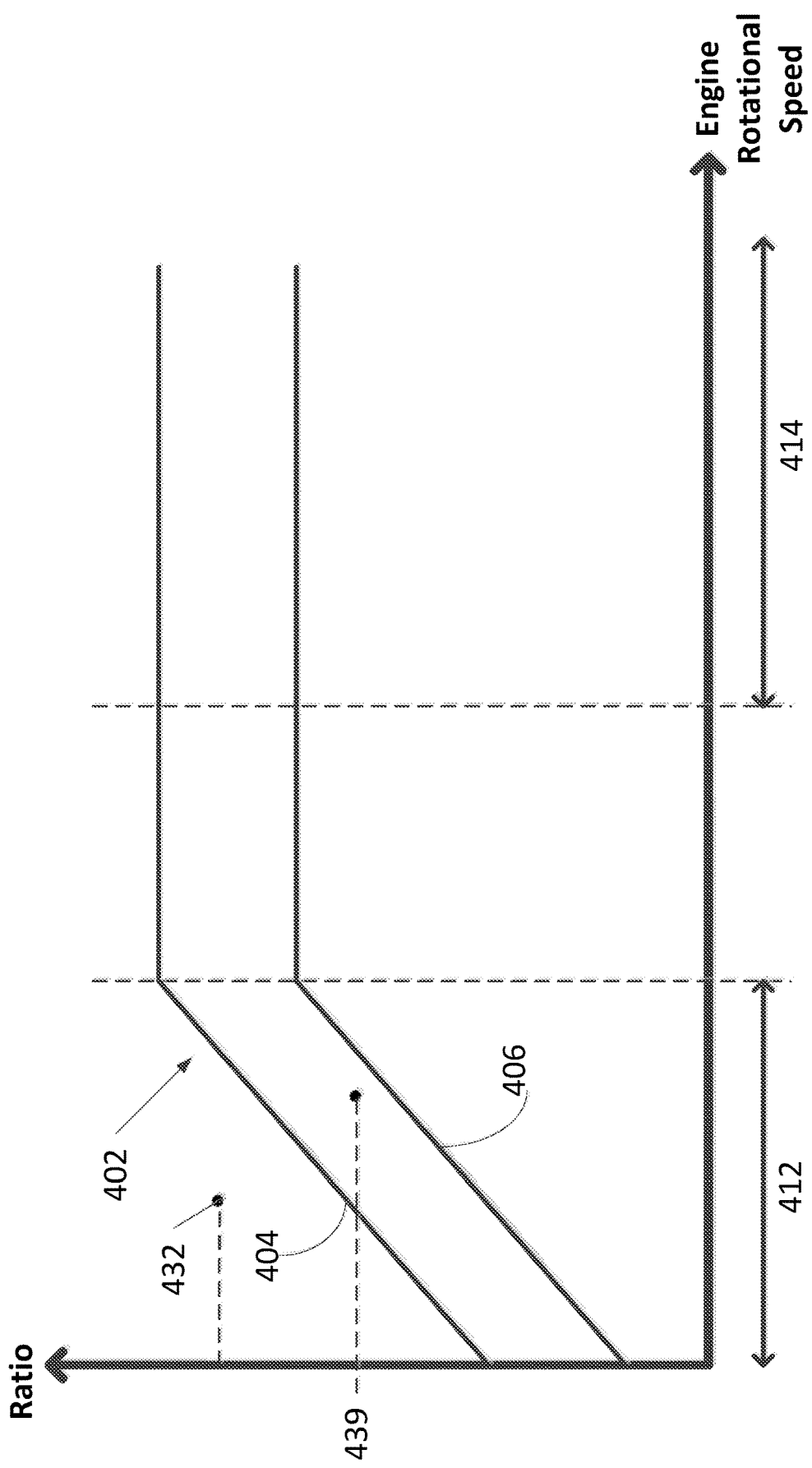
FIG. 4B is an example graphical representation of a threshold having upper and lower limits for detecting a high temperature condition of an engine.

Referring now to FIG. 4B, in accordance with an embodiment, the threshold 402 comprises an upper limit 404 and a lower limit 406. In some embodiments, step 208 of detecting the high temperature condition comprises detecting when the ratio exceeds the upper limit 404. For example, the first example ratio 432 is illustrated as exceeding the upper limit 404 in FIG. 4B.

The method 200 may further comprising determining if the ratio is between the lower limit 406 and the upper limit 404. As illustrated, a third example ratio 439 is shown between the lower limit 406 and the upper limit 404 in FIG. 4B. Determining if the ratio is between the lower limit 406 and the upper limit 404 may be used to predict if the high temperature condition of the engine 10 is likely to occur. Accordingly, if it is determined that the ratio is between the lower limit 406 and the upper limit 404, then the method 200 may further comprise taking one or more corrective action. The specific corrective action taken may depend on the state of the engine 10. For example, if the engine 10 is in low power operation, then the fuel flow to the combustor may be increased when the ratio is between the lower limit 406 and the upper limit 404. By way of another example, if the engine 10 is in low power operation, then the extractions on the engine 10 may be prevented when the ratio is between the lower limit 406 and the upper limit 404. The type of corrective action taken may be based on engine rotational speed and/or may be set by the manufacture.

The method 200 may further comprise taking one or more of the corrective actions, in response to detecting the high temperature condition. For example, the corrective action may be taken automatically by the engine control system and/or the aircraft control system. For instance, detecting of the high temperature condition may comprises trigger logic within the control system that then takes one or more of the corrective actions. Accordingly, in response to detecting the high temperature condition, one or more of the corrective actions may be taken to prevent over heating of the engine 10. The corrective action may vary depending on the state (e.g., idling or accelerating) of the engine 10. For example, if the engine 10 is in low power operation, then extractions on the engine 10 can be prevented, in response to detecting the high temperature condition. By way of another example, if the engine 10 is idling on the ground, then the engine 10 may be shut down in response to detecting the high temperature condition. It can be noted that engines used in aircraft are typically optimized for high power operations which may result in having a lack of efficiency in low power operations. The lack of efficiency of engines in low power operations may lead to overheating.

It can also be noted that when the ambient temperature is high and the engine 10 is accelerating, over fueling may occur. Over fueling refers to the amount of fuel provided being in excess of the fuel need for steady state operation of the engine 10. For instance, in electronically controlled engines where the change of engine rotational speed is achieved by tracking a predetermined gas generator acceleration schedule, over fueling may occur as a result of the acceleration schedule not being adapted to varying ambient temperatures. Accordingly, for example, in response to detecting the high temperature condition, the over fueling caused by the acceleration schedule can be reduced, which would otherwise result in a longer acceleration time. By way of another example, when the engine 10 is accelerating, the extractions on the engine 10 may be temporarily reduced to allow for a faster acceleration and then reinstated once a high power is reached.

When a corrective action is taken, the corrective action may be taken until it is suitable to no longer do so. For example, in the cases where the extractions are reduced and/or prevented, extractions may then be re-instated and/or allowed once it is suitable to do so.

While the threshold 402 is illustrated as a function of engine rotational speed. The threshold may be a function of one or more conditions. Such conditions may include engine rotational speed, altitude, ambient temperature, aircraft bypass door position and/or any other suitable condition or engine application. In accordance with an embodiment, a threshold is selected from a plurality of thresholds depending on one or more of the aforementioned conditions. For example, different thresholds may be used for different ranges of ambient temperature and a specific threshold may be selected depending on the current ambient temperature. By way of another example, a different threshold may be used for different ranges of altitude and a specific threshold may be selected depending on the current altitude. The selected threshold may also vary as a function of engine rotational speed. Therefore, in some embodiments, the method 200 further comprises a step 207 of selecting a threshold from a plurality of thresholds as a function of a current operating state of the engine It should be appreciated that by using the ratio to model the temperature of the engine 10, the engine 10 may be used with no temperature indication or degraded temperature indication in the case of temperature system and/or sensor malfunction.

Figure 5:
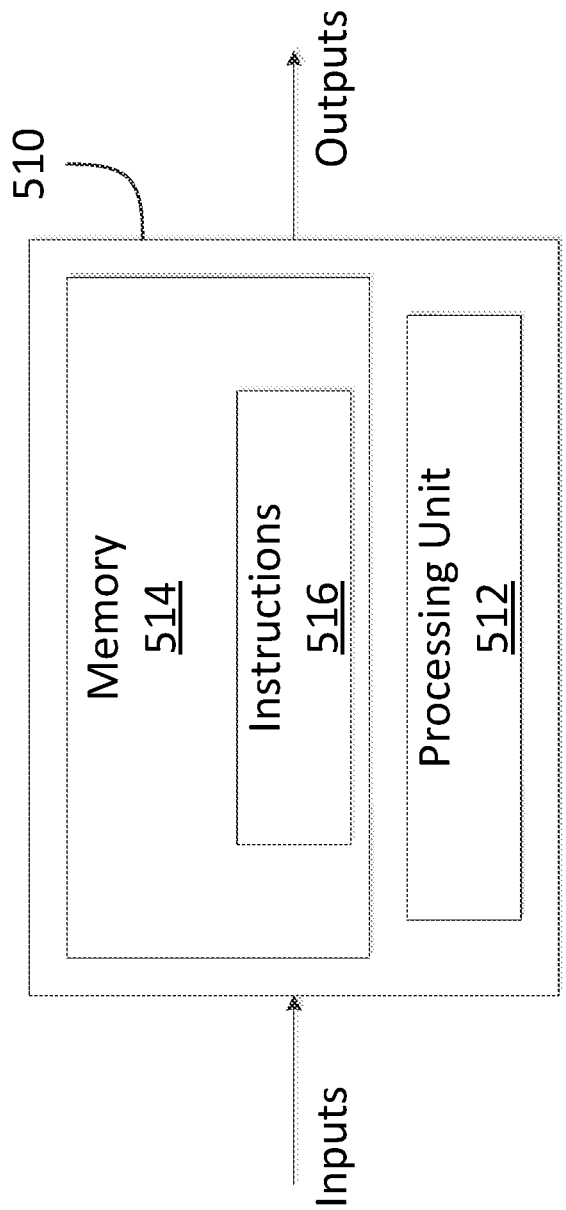
FIG. 5 is a block diagram of an example computing device for implementing the method of FIG. 2.

The method 200 may be implemented by a control system. With reference to FIG. 5, the control system may be implemented by a computing device 510, comprising a processing unit 512 and a memory 514 which has stored therein computer-executable instructions 516. The processing unit 512 may comprise any suitable devices configured to implement the method 200 such that instructions 516, when executed by the computing device 510 or other programmable apparatus, may cause the functions/acts/steps performed as part of the method 200 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

Note that the control system can be implemented as part of a full-authority digital engine controls (FADEC) or other similar device, including electronic engine control (EEC), engine control unit (EUC), and the like.

The methods and systems for detecting a high temperature condition of a gas turbine engine described herein may be implemented in a high level procedural or object oriented programming or scripting language, or a combination thereof, to communicate with or assist in the operation of a computer system, for example the computing device 510. Alternatively, the methods and systems for detecting a high temperature condition of a gas turbine engine may be implemented in assembly or machine language. The language may be a compiled or interpreted language. Program code for implementing the methods and systems for detecting a high temperature condition of a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting a high temperature condition of a gas turbine engine may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting a high temperature condition of a gas turbine engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for detecting a high temperature condition of a gas turbine engine, the method comprising:
    obtaining a fuel flow to a combustor of the engine and a compressor outlet pressure of the engine;
    modeling a temperature of the engine by determining a ratio of the fuel flow to the compressor outlet pressure, the ratio replacing a measured temperature of the engine;
    comparing the ratio to a threshold that varies as a function of engine rotational speed; and
    detecting a high temperature condition of the engine when the ratio exceeds the threshold, wherein the high temperature condition is detected in absence of the measured temperature of the engine.

2. The method of claim 1, wherein the threshold increases with increasing engine rotational speed for a first range of engine rotational speeds.

3. The method of claim 2, wherein the threshold is constant for a second range of engine rotational speeds, the second range following the first range.

4. The method of claim 3, wherein the first range of engine rotational speeds corresponds to the engine idling and the second range of engine rotational speeds corresponds to the engine accelerating.

5. The method of claim 1, further comprising determining a current engine rotational speed and wherein comparing the ratio to the threshold comprises comparing the ratio to the threshold based on the current engine rotational speed.

6. The method of claim 1, wherein the threshold corresponds to an engine temperature limit while the engine is operating under at least one steady state condition.

7. The method of claim 6, further comprising selecting the threshold from a plurality of thresholds as a function of a current operating state of the engine.

8. The method of claim 1, wherein obtaining the fuel flow and the compressor outlet pressure comprises measuring the fuel flow and the compressor outlet pressure.

9. The method of claim 1, further comprising selecting the threshold from a plurality of thresholds depending on one or more of engine rotational speed, altitude, ambient temperature and aircraft bypass door position.

10. A system for detecting a high temperature condition of a gas turbine engine, the system comprising:
a processing unit; and
a non-transitory computer-readable memory having stored thereon program instructions executable by the processing unit for:
obtaining a fuel flow to a combustor of the engine and a compressor outlet pressure of the engine;
modeling a temperature of the engine by determining a ratio of the fuel flow to the compressor outlet pressure, the ratio replacing a measured temperature of the engine;
comparing the ratio to a threshold that varies as a function of engine rotational speed; and
detecting a high temperature condition of the engine when the ratio exceeds the threshold, wherein the high temperature condition is detected in absence of the measured temperature of the engine.

11. The system of claim 10, wherein the threshold increases with increasing engine rotational speed for a first range of engine rotational speeds.

12. The system of claim 11, wherein the threshold is constant for a second range of engine rotational speeds, the second range following the first range.

13. The system of claim 12, wherein the first range of engine rotational speeds corresponds to the engine idling and the second range of engine rotational speeds corresponds to the engine accelerating.

14. The system of claim 10, wherein the program instructions are further executable by the processing unit for determining a current engine rotational speed and wherein comparing the ratio to the threshold comprises comparing the ratio to the threshold based on the current engine rotational speed.

15. The system of claim 10, wherein the threshold corresponds to an engine temperature limit while the engine is operating under at least one steady state condition.

16. The system of claim 15, wherein the program instructions are further executable by the processing unit for selecting the threshold from a plurality of thresholds as a function of a current operating state of the engine.

17. The system of claim 10, wherein obtaining the fuel flow and the compressor outlet pressure comprises measuring the fuel flow and the compressor outlet pressure.

18. The system of claim 10, wherein the program instructions are further executable by the processing unit for selecting the threshold from a plurality of thresholds depending on one or more of engine rotational speed, altitude, ambient temperature and aircraft bypass door position.

* * * * *